United States Patent

Yu

[19]

[11] Patent Number: 5,923,173
[45] Date of Patent: Jul. 13, 1999

[54] CIRCUIT FOR DETECTING A WRONG OPERATION OF A FLYBACK TRANSFORMER

[75] Inventor: Kyung-Ho Yu, Seoul, Rep. of Korea

[73] Assignee: Daewoo Electronics Co., Ltd., Seoul, Rep. of Korea

[21] Appl. No.: 08/921,529

[22] Filed: Sep. 2, 1997

[30] Foreign Application Priority Data

Aug. 31, 1996 [KR] Rep. of Korea ....................... 96-37574
Aug. 31, 1996 [KR] Rep. of Korea ....................... 96-37575

[51] Int. Cl.⁶ .................................................. G01R 31/06
[52] U.S. Cl. ........................... 324/547; 324/546; 324/726
[58] Field of Search .................................... 324/388, 546, 324/547, 726; 315/411; 340/646

[56] References Cited

U.S. PATENT DOCUMENTS

| | | | |
|---|---|---|---|
| 3,934,194 | 1/1976 | Paprocki | 324/547 |
| 3,990,002 | 11/1976 | Baum | 324/546 |
| 4,064,454 | 12/1977 | Yoshino et al. | 324/547 |
| 4,090,111 | 5/1978 | Suzuki | 315/411 |
| 4,885,509 | 12/1989 | Ikeuchi | 315/411 |
| 5,278,746 | 1/1994 | Matsumoto | 363/21 |
| 5,717,338 | 2/1998 | Cook | 324/546 |

FOREIGN PATENT DOCUMENTS 8237505   9/1996   Japan .

*Primary Examiner*—Diep N. Do
*Attorney, Agent, or Firm*—Jacobson, Price, Holman & Stern, PLLC

[57] ABSTRACT

A circuit, which can detect a wrong operation of a flyback transformer having a low voltage coil and a high voltage coil, includes a voltage sensing coil which is disposed at the flyback transformer in order to generate a sensed voltage corresponding to a high voltage generated by the high voltage coil. A voltage sensing circuit generates a voltage-sensed signal corresponding to the sensed voltage and provides the voltage-sensed signal to a determination circuit. The determination circuit determines whether the flyback transformer is out of order based on the voltage-sensed signal and the horizontal frequency signal, and generates a determination signal according to the determination result. The shut-down circuit shuts down the flyback transformer in response to the determination signal, thereby preventing the abnormal flyback transformer from generating a dangerously high voltage.

15 Claims, 3 Drawing Sheets

CIRCUIT FOR DETECTING A WRONG OPERATION OF A FLYBACK TRANSFORMER

BACKGROUND OF THE INVENTION

1. Field of the Invention

This invention is related to a flyback transformer for developing a high voltage which is applied to an anode of a cathode ray tube. More particularly, the present invention is related to a circuit for detecting a wrong operation of a flyback transformer.

2. Description of the Prior Art

Generally a high voltage, which is applied to an anode of a cathode ray tube of a display apparatus such as a television, a monitor, etc., is developed by a flyback transformer (hereinafter, referred to as FBT). A high voltage generating circuit develops a low voltage pulse according to a horizontal driving signal which is provided from a horizontal driving circuit, and provides the low voltage pulse to a low-voltage coil of the FBT in order to make it possible to generate the high voltage. The high voltage generating circuit rectifies an induced voltage pulse which is outputted from a high-voltage coil of the FBT to generate the high voltage, and provides the high voltage to the anode of the cathode ray tube(hereinafter, referred to as CRT).

One example of a high voltage generating circuit is disclosed in U.S. Pat. No. 5,278,746 issued to Tadahiko Matsumoto on the date of Jan. 11, 1994. The high voltage generating circuit suggested by Tadahiko Matsumoto includes a FBT having a low-voltage coil and a high-voltage coil and a first switching element disposed in a current path among a drive power source, the low-voltage coil and ground. The first switching element is turned on and off to charge and discharge a resonance capacitor, thereby generating flyback pulse. The high voltage generating circuit also detects an output voltage of the high-voltage coil, and controls a peak value of a flyback pulse, which is applied to the low-voltage coil on the basis of the detected output voltage. The high voltage generating circuit further includes a second switching element disposed in the current path among the drive power source, the low-voltage coil and ground. The second switching element is turned on the moment that the first switching element is turned off, thereby transferring electrical energy stored in the low-voltage coil to the resonance capacitor. After the transfer of the electric energy, a charging capacitor is charged by an inverse current flowing from the resonance capacitor to the drive power source. Therefore, the high voltage generating circuit suggested by Tadahiko Matsumoto can control a high voltage which is generated from the high-voltage coil of the FBT.

However, though Tadahiko Matsumoto's high voltage generating circuit can regulate the output voltage of the FBT, the circuit has a problem that when the FBT is out of order, the circuit causes the FBT to develop a dangerously high voltage.

SUMMARY OF THE INVENTION

It is one object of the present invention to provide a circuit which can detect a wrong operation of a flyback transformer.

It is another object of the present invention to provide a circuit which can disable a flyback transformer which is out of order.

In order to achieve the above objects, a circuit according to the present invention includes a pulse generation means for generating a flyback pulse signal according to a horizontal frequency signal and providing the flyback pulse to the low voltage coil; a voltage sensing means for sensing a high voltage which is developed by the high voltage coil and generating a voltage-sensed signal corresponding to the high voltage; a determination means for determining whether the flyback transformer is out of order based on the voltage-sensed signal and the horizontal frequency signal; and a disablement means for disabling the flyback transformer in response to a determination result of the determining means.

According to the present invention, the circuit can detect a wrong operation of a flyback transformer and disable the abnormal flyback transformer, thereby preventing the abnormal flyback transformer from generating a dangerously high voltage.

BRIEF DESCRIPTION OF THE DRAWINGS

The foregoing and other objects, aspects and advantages will be better understood from the following detailed description of preferred embodiments of the invention with reference to the drawings, in which.

DESCRIPTION OF THE PREFERRED EMBODIMENT

Preferred embodiments of the present invention will be illustrated below with reference to the accompanying drawings.

Figure 1:
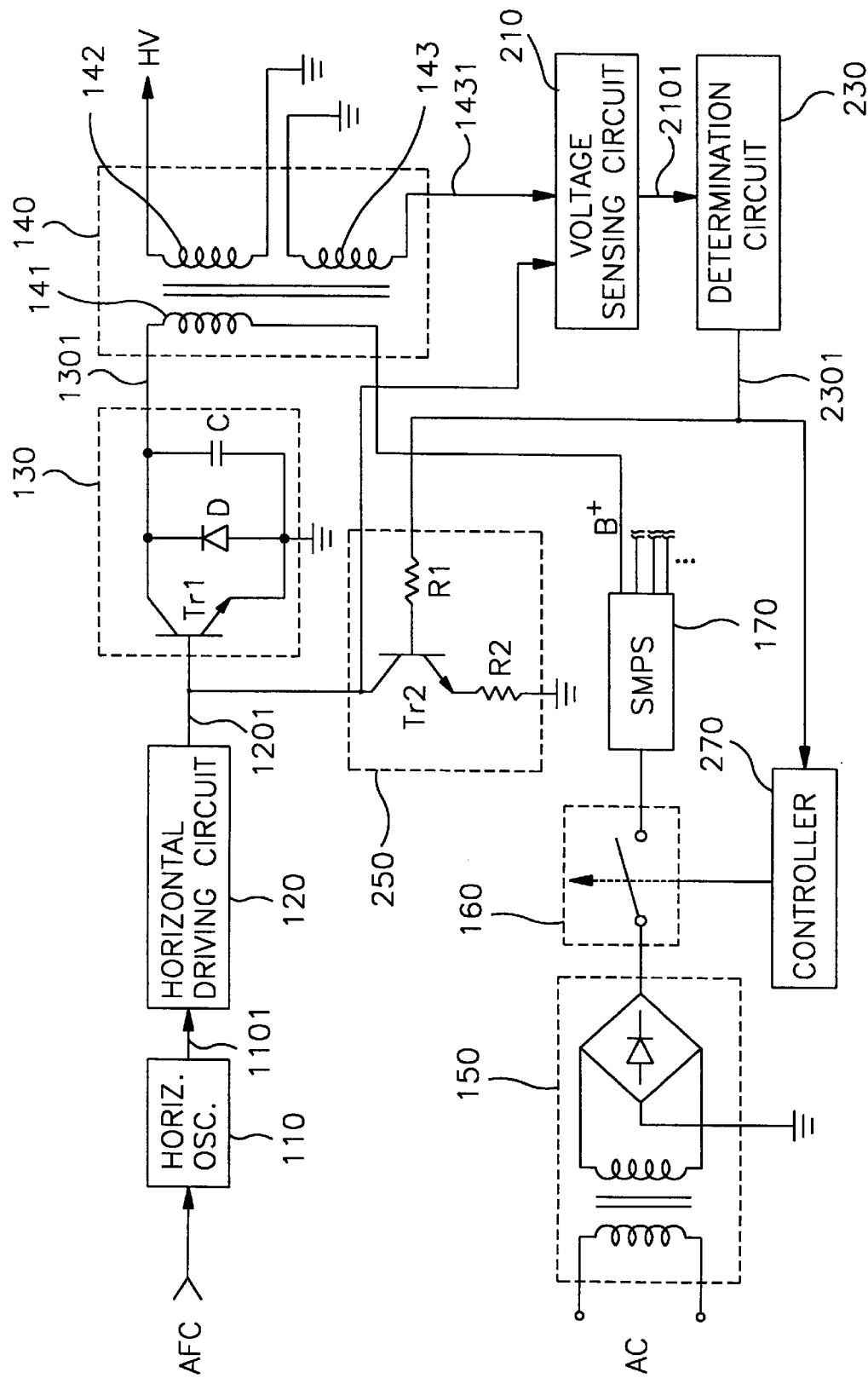
FIG. 1 shows a circuit for detecting wrong operation of a FBT according to one example of the present invention.

FIG. 1 shows a circuit for detecting wrong operation of a FBT according to one example of the present invention.

Referring to FIG. 1, The circuit for detecting wrong operation of a FBT includes a horizontal oscillator 110, a horizontal drive circuit 120, a horizontal output circuit 130, a primary power supply 150, a switch 160, a switch modulation power supply(hereinafter, referred to as SMPS) 170, a voltage sensing circuit 210, a signal determination circuit 230, a shut-off circuit 250, and a control part 270.

The horizontal oscillator 110 generates a horizontal frequency signal 1101 corresponding to a horizontal sync signal which is provided from exterior, and provides the horizontal frequency signal 1101 to the horizontal drive circuit 120.

The horizontal drive circuit 120 develops a horizontal drive signal 1201 according to the horizontal frequency signal 1101 from the horizontal oscillator 110, and provides the horizontal drive signal 1201 to the horizontal output circuit 130.

The horizontal output circuit 130 generates a flyback pulse 1301 according to the horizontal drive signal 1201, and provides the flyback pulse 1301 to a low voltage coil 141 of the FBT.

The FBT 140 includes the low voltage coil 141, a high voltage coil 142, and a voltage sensing coil 143. The high voltage coil 142 generates a high voltage(hereinafter, referred to as HV) which is induced by a magnetic flux variation developed by the low voltage coil 141. The HV, which is generated from the high voltage coil 142, is provided to an anode of a cathode ray tube(not shown in FIG. 1). Further, the voltage sensing coil 143 generates a sensed voltage 1431 corresponding to the HV as the high voltage coil 142 generates the HV, and provides the sensed voltage 1431 to the voltage sensing circuit 210.

The voltage sensing circuit 210 generates a voltage-sensed signal 2101 corresponding to the sensed voltage 1431 which is continuously inputted from the voltage sensing coil 143 and in response to the horizontal drive signal 1201 from the horizontal drive circuit 120. Also, the voltage sensing circuit a 210 provides the voltage-sensed signal 2101 to the signal determination circuit 230.

Figure 2:
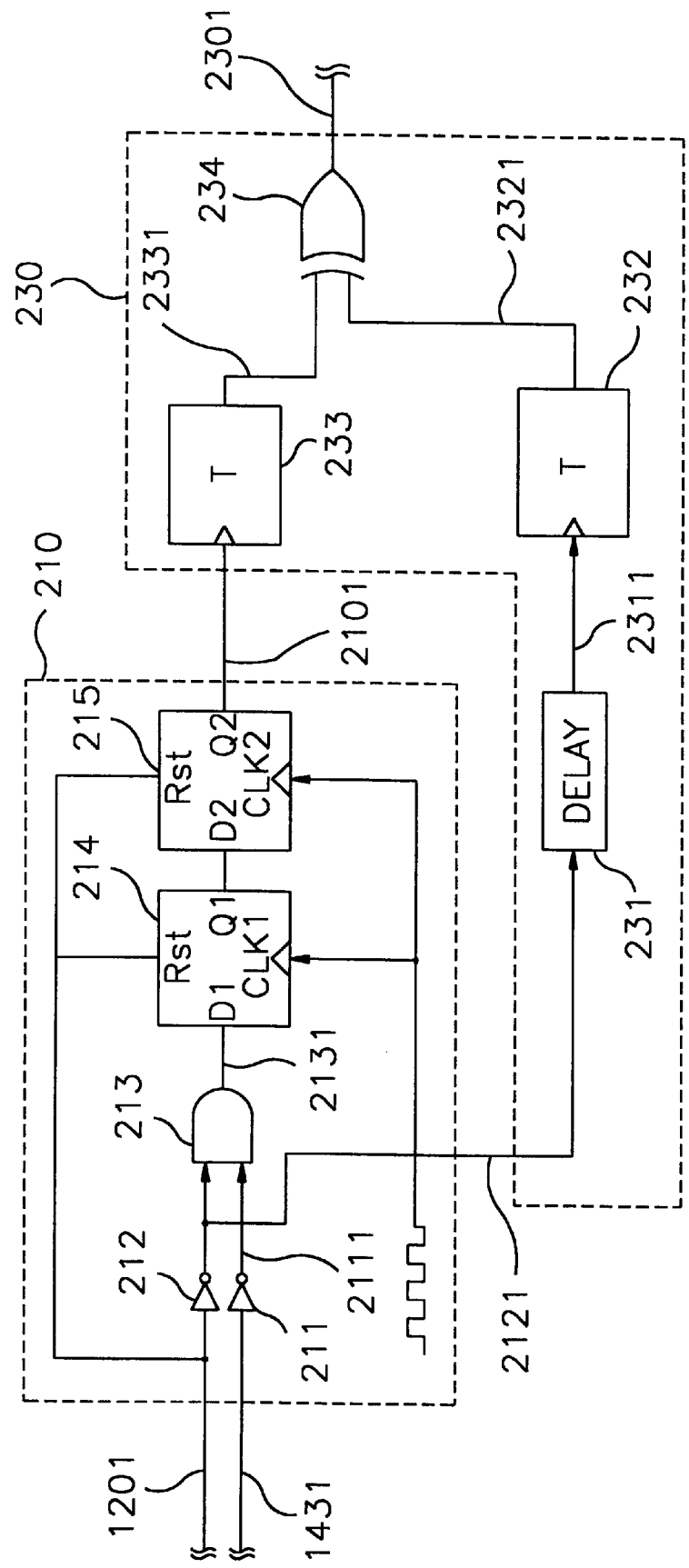
FIG. 2 is a circuit for showing the voltage sensing circuit 210 and the signal determination circuit 230 depicted in FIG. 1.

FIG. 2 is a circuit for showing the voltage sensing circuit 210 and the signal determination circuit 230 depicted in FIG. 1.

Referring to FIG. 2, the voltage sensing circuit 210 includes a schmitt trigger 211, an inverter 212, an AND gate 213, a first D flip-flop 214, and a second D flip-flop.

The input terminal of the schmitt trigger 211 is electrically connected to the voltage sensing coil 143, and the output terminal of that is electrically connected to the one input terminal of the AND gate 213. The schmitt trigger 211 translates the sensed voltage 1431 which is provided from the voltage sensing coil 143 into a first logic signal 2111. That is, the schmitt trigger 211 generates a low logic signal when the sensed voltage 1431 is lower than a predetermined voltage, and a high logic signal when the sensed voltage 1431 is higher than the predetermined voltage as the first logic signal 2111. The schmitt trigger 211 provides the first logic signal 2111 to the AND gate 213.

The input terminal of the inverter 212 is connected to an output terminal of the horizontal drive circuit 120 and the output terminal of that is connected to the other terminal of the AND gate. The inverter 212 reverses a phase of the horizontal drive signal 1201, and outputs the reversed horizontal drive signal as a second logic signal 2121 to the AND gate 213.

The AND gate 213 logic-ANDs the first logic signal 2111 and the second logic signal 2121 in order to output the first logic signal 2111 from the schmitt trigger 211 for a high-state of the second logic signal 2121 from the inverter 212. That is, the AND gate 213 outputs the sensed voltage 1431, which is induced in the voltage sensing coil 143 by the flyback pulse 1301 and is translated into the first logic signal 2111 by the schmitt trigger 211, as a third logic signal 2131, so that a noise component which is generated in the voltage sensing coil 143 during a period between the flyback pulses is removed. The AND gate 213 outputs the third logic signal 2131, which is generated by logic-ANDing the first logic signal 2111 and the second logic signal 2121, to a first D input terminal D1 of the first D flip-flop 214.

The first D flip-flop 214 has a first clock input terminal CLK1, the first D input terminal D1, a first reset terminal Rst1 and a first Q output terminal Q1. The first reset terminal Rst1 is connected to the output terminal of the horizontal drive circuit 120. When a clock signal, which is generated by a clock signal generation source(not shown in FIG. 2), is inputted to the first clock input terminal CLK1 of the first D flip-flop 214, the first D flip-flop 214 outputs the third logic signal 2131 which is inputted through the first D input terminal D1 to the first Q output terminal Q1 thereof.

The second D flip-flop 215 has a second clock input terminal CLK2, a second D input terminal D2, a second reset terminal Rst2, and a second Q output terminal Q2. The second reset terminal is connected to the output terminal of the horizontal drive circuit 120. When a clock signal, which is provided from the clock signal generation source, is inputted to the second clock input terminal CLK2 of the second D flip-flop 215, the second D flip-flop 215 outputs a first Q output signal 2141 which is generated by the first D flip-flop 214 to the second Q output terminal Q2 thereof as the voltage-sensed signal 2101.

Therefore, since each of the first and second D flip-flops 214 and 215 cannot output input signals, each of which is inputted to each of their the first and second D input terminals, for a low-logic state of the clock signal, each of the first and second D flip-flops 214 and 215 removes a noise component, which is included in the third logic signal 2131, during a ½-period of the clock signal, respectively. Preferably, two positive-edge-triggered D flip-flops are used as the first and second D flip-flops 214 and 215.

The signal determination circuit 230 determines whether or not, the FBT 140 is out of order based on the horizontal drive signal 1201 from the horizontal drive circuit 120 and the voltage-sensed signal 2101 from the voltage sensing circuit 210, and generates a determination signal 2301 according to the determination result. The signal determination circuit 230 provides the determination signal 2301 to the shut-down circuit 250 and the control part 270, respectively.

The signal determination circuit 230 includes a reference signal generation circuit, a comparison signal generation circuit and a comparing circuit.

The reference signal generation circuit generates a reference signal 2321 by processing the horizontal drive signal 1201. The comaprison signal generation circuit geneates a comparison signal 2331 by processing the voltage senced signal 2101. And, the comaring circuit compares the comparison signal 2331 with the reference signal 2321 to generate the determination signal 2301.

Referring to FIG. 2, the reference signal generation circuit preferably includes a delay 231 and a first T flip-flop 232.

The delay 231 delays the second logic signal 2121 in order to synchronize the second logic signal 2121 from the inverter 212 of the voltage sensing circuit 210 with the voltage-sensed signal 2101 from the second D flip-flop 215, thereby generating a delayed signal 2311.

The first T flip-flop 232 inverts the delayed signal 2311 from the delay 231 at the positive-edge of the delayed signal 2311 to generate a first T-signal 2321, and outputs the first T-signal 2321 as the reference signal 2321 to the comparing circuit.

Preferably, the comparison signal generation circuit is a second T flip-flop 233.

The second T flip-flop 233 inverts the voltage-sensed signal 2101 from the second D flip-flop 215 of the voltage sensing circuit 210 at the positive-edge of the delayed signal 2311 to generate a second T-signal 2331, and outputs the second T-signal 2331 as the comparison signal 2331 to the comparing circuit.

And, the comparing circuit preferably is a XOR gate 234.

The XOR gate 234 XORs the first T-signal 2321 and the second T-signal 2331 to generate the determination signal 2301, and provides the determination signal 2301 to the shut-down circuit 250 and the control part 260, respectively.

The shut-down circuit 250 shuts down the horizontal output circuit 130 in response to the determination signal 230 provided from the XOR gate 234, so that the horizontal output circuit 130 can not generate the flyback pulse 1301.

The shut-down circuit 250 preferably includes a first resister R1, a second resister R2, and a NPN transistor Tr2 in order to shut down the horizontal output circuit 130. The one terminal of the first resister R1 is connected with the base terminal of the NPN transistor Tr2, and the other terminal of the first resister R1 is connected with the output terminal of the XOR gate 234. The one terminal of the second resister R2 is connected with the emitter terminal of the NPN transistor Tr2, and the other terminal of the second resister R2 is connected to a ground. The collector terminal of the NPN transistor Tr2 is connected to the output terminal of the horizontal drive circuit 120. The NPN transistor Tr2 is turned on or off according to a logic state of the determination signal 2301 provided from the XOR gate 234, thereby cutting off the horizontal drive signal 1201 to be outputted to the horizontal output circuit 130.

Further, the control part 270 controls in response to the determination signal 2301 a switch 160 which electrically connects the primary power supply 150 with the SMPS 170. As the switch 160 is turned on or off, an electrical power, which is generated by the primary power supply 150, is provided to the SMPS 170 or cut off, so that the FBT 140 is operated or disabled.

Operations of the circuit for detecting a wrong operation of a FBT according to the present invention will be described below in detail.

FIGS. 3A through 3J are wave form diagrams for showing the operations at several portions of the circuits depicted in FIGS. 1 and 2.

Figure 3:
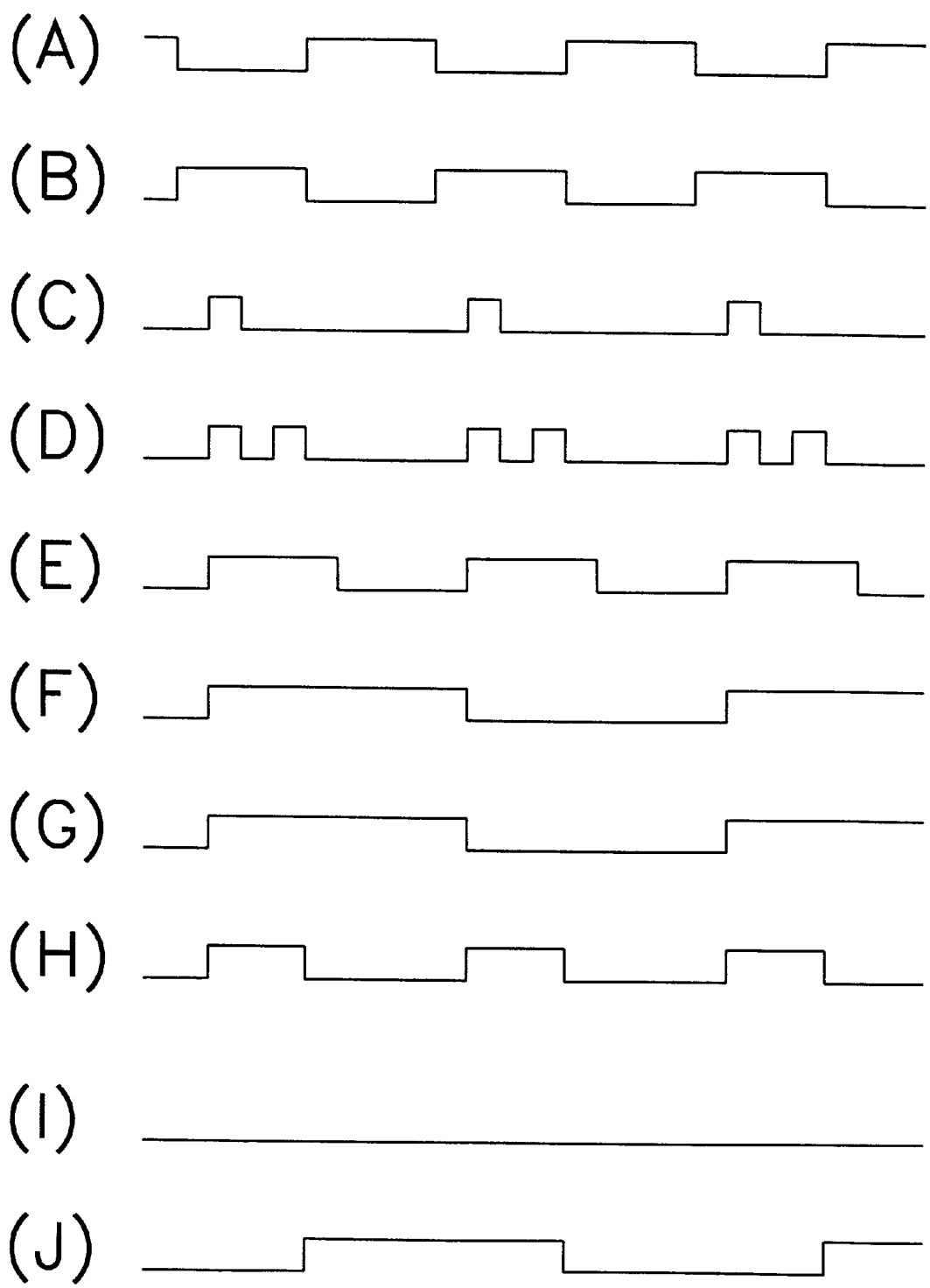
FIGS. 3A through 3J are wave form diagrams for showing the operations at several portions of the circuits depicted in FIG. 1 and 2.

When the horizontal drive signal 1201, as shown in FIG. 3A, is inputted to the horizontal output circuit 130, the horizontal output circuit 130 generates the flyback pulse 1301, as shown in FIG. 3C, corresponding to the horizontal drive signal 1201.

When the flyback pulse 1301 is inputted to the low voltage coil 141 of the FBT 140, the high voltage coil 142 generates the high voltage HV according to the flyback pulse 1301. At the same time, the voltage sensing coil 143 generates the sensed voltage 1431 corresponding to the high voltage HV generated from the high voltage coil 142, which is provided to the schmitt trigger 211.

When the FBT 140 is in normal operation, the FBT 140 generates the same number of the high voltage pulses as that of the flyback pulses 1301, so that the schmitt trigger 211 generates the first logic signal 2111 having the same frequency as that of the flyback pulses 1301, as shown in FIG. 2C. On the contrary, when the FBT 140 is out of order, the FBT 140 generates a greater number of high voltage pulses than that of the flyback pulses 1301, for example, two high voltage pulses to the one flyback pulse, so that the schmitt trigger 211 generates the first logic signal 2111 having a frequency more than two times frequency that of the flyback pulses, as shown in FIG. 3D.

Also, the horizontal drive signal 1201 which is generated by the horizontal drive circuit 120 is provided to inverter 212. The inverter 212 inverts a phase of the horizontal drive signal 1201 to generate the second logic signal 2121, as shown in FIG. 3B, and provides the second logic signal 2121 to the AND gate 213.

The AND gate 213 logic-ANDs the first logic signal 2111 from the schmitt trigger 211 and the second logic signal 2121 from the inverter 212 to generate the third logic signal from which a noise component is removed. That is, the AND gate 213 only outputs a logic state of the first logic signal 2111 during the second logic signal 2121 is a high-logic state.

As illustrated above, the first and second D flip-flops 214 and 215 generate the voltage sensed signal 2101 from which a noise component is removed, and provide the voltage sensed signal 2101 to the determination circuit 230.

The delay 231 of the determination circuit 230 delays the second logic signal 2121 from the inverter 212 for the predetermined period to develop the delayed signal 2311, as shown in FIG. 3E, and provides the delayed signal 2311 to the first T flip-flop 232.

The first T flip-flop 232 inverts an output state of itself at the positive-edge of the delayed signal 2311 to produce a reference signal 2321, as shown in FIG. 3F, and provides the reference signal 2321 to the XOR gate 234.

When the voltage sensed signal 2101 of FIG. 3C is inputed from the voltage sensing circuit 210 to the second T flip-flop 233, the second T flip-flop 233 generates a comparison signal 2331 which is depicted in FIG. 3G. On the contrary, when the voltage sensed signal 2101 of FIG. 3D is inputted from the voltage sensing circuit 210 to the second T flip-flop 233, the second T flip-flop 233 generates the comparison signal 2331 which is depicted in FIG. 3H. Also, the second T flip-flop 233 provides the comparison signal 2331 according to the sensed signal 2101 to the XOR gate 234.

When the comparison signal 2331 of FIG. 3G is inputted from the second T flip-flop to the XOR gate 234, the XOR gate 234 produces a logic-low signal as the determination signal 2301, as shown in FIG. 3I. Differently, when the comparison signal 2331 of FIG. 3H is inputted from the second T flip-flop to the XOR gate 234, the XOR gate 234 produces the determination signal 2301 of FIG. 3J.

The NPN transistor Tr2 of the shut-down circuit 250 is turned on when a high-logic signal as the determination signal is the base of the NPN transistor Tr2, so that the NPN transistor Tr2 prevents the horizontal drive signal from being provided to the horizontal output circuit 130 in order to prevent the horizontal output circuit 130 from generating the flyback pulse 1301.

Further, at the same time, the control part 270 causes the switch 160 to be turned on to prevent the primary power supply 150 from providing the power to the SMPS 170, so that the FBT 140 is disabled.

Therefore, the circuit according to the present invention detects a wrong operation of a flyback transformer and disables the abnormal flyback transformer, thereby preventing the abnormal flyback transformer from generating a dangerously high voltage.

While the invention has been described in terms of a preferred single embodiment, those skilled in the art will recognize that the invention can be practiced with modification within the spirit and scope of the appended claims.

What is claimed is:

1. A circuit for detecting a wrong operation of a flyback transformer having a low voltage coil and a high voltage coil, the circuit comprising:

pulse generation means for generating a flyback pulse signal according to a horizontal frequency signal and providing the flyback pulse to the low voltage coil;

voltage sensing means for sensing a high voltage which is developed by the high voltage coil and generating a voltage-sensed signal corresponding to the high voltage;

determination means for determining whether the flyback transformer is out of order based on a result of comparing the voltage-sensed signal with the horizontal frequency signal; and disablement means for disabling the flyback transformer in response to a determination result of the determining means.

2. A circuit as claimed in claim 1, wherein said pulse generation means includes a horizontal drive circuit for developing a horizontal drive signal according to the horizontal frequency signal; and a horizontal output circuit for generating the flyback pulse signal according to the horizontal drive signal.

3. A circuit as claimed in claim 2, wherein said disablement means is a transistor having a collector terminal which is connected with an output terminal of the horizontal drive circuit, a base to which a determination signal generated by the determination means is inputted, and an emitter terminal which is connected with a ground.

4. A circuit as claimed in claim 1, wherein said voltage sensing means includes a voltage sensing coil which is disposed at the flyback transformer and driven by the low voltage coil, thereby generating a sensed voltage corresponding to the high voltage generated by the high voltage coil;

a schmitt trigger for schmitt-triggering the sensed voltage to generate a first logic signal;

an inverter for inverting the flyback pulse signal to generate a second logic signal;

an AND gate for ANDing the first logic signal and the second logic signal to generate a third logic signal;

a first D flip-flop having a first D input terminal, a first clock input terminal and a first Q output terminal, the first D flip-flop for outputting the third logic signal which is inputted through the first D input terminal as a clock signal is inputted through the first clock input terminal thereof and generating a first Q output signal; and a second D flip-flop having a second D input terminal, a second clock input terminal and a second Q output terminal, the second D flip-flop for outputting the first Q output signal as a clock signal is inputted through the second clock input terminal thereof and generating a second Q output signal as the voltage-sensed signal.

5. A circuit as claimed in claim 1, wherein said determination means includes a reference signal generation circuit for generating a reference signal by processing the horizontal drive signal;

a comparison signal generation circuit for generating a comparison signal by processing the voltage sensed signal; and a comparing circuit for comparing the comparison signal with the reference signal to generate a determination signal.

6. A circuit as claimed in claim 5, wherein said reference signal generation circuit includes a delay for delaying the horizontal drive signal in order to synchronize the horizontal drive signal with the voltage-sensed signal for a predetermined period, thereby generating a delayed signal; and a first T flip-flop for inverting the delayed signal at the positive-edge of the delayed signal in order to generate a first T-signal, and outputting the first T-signal as the reference signal.

7. A circuit as claimed in claim 5, wherein said comparison signal generation circuit is a second T flip-flop for inverting the voltage-sensed signal at the positive-edge of the delayed signal in order to generate a second T-signal, and outputting the second T-signal as the comparison signal.

8. A circuit as claimed in claim 5, wherein said comparing circuit is an XOR gate for XORing the reference signal and the comparison signal in order to generate the determination signal.

9. A circuit for detecting a wrong operation of a flyback transformer having a low voltage coil and a high voltage coil, the circuit comprising:

an oscillator for generating a horizontal frequency signal;

a horizontal drive circuit for developing a horizontal drive signal according to the horizontal frequency signal;

a horizontal output circuit for generating a flyback pulse signal according to the horizontal drive signal;

a voltage sensing coil which is disposed at the flyback transformer and driven by the low voltage coil, thereby generating a sensed voltage corresponding to a high voltage generated by the high voltage coil;

a first logic means for translating the sensed voltage from the voltage sensing coil into a first logic signal;

a second logic means for translating the horizontal drive signal into a second logic signal;

a third logic means for outputting the first logic signal in response to the second logic signal to generate a third logic signal;

a fourth logic means for outputting the third logic signal in response to the horizontal drive signal and a clock signal which is provided from exterior in order to generate a voltage-sensed signal;

a determination means for determining whether the flyback transformer is out of order based on the voltage-sensed signal and the horizontal frequency signal and generating a determination signal according to the determination result; and a disablement means for disabling the flyback transformer in response to the determination signal.

10. A circuit as claimed in claim 9, wherein said first logic means is a schmitt trigger for schmitt-triggering the sensed voltage.

11. A circuit as claimed in claim 9, wherein said second logic means is an inverter for inverting the flyback pulse signal.

12. A circuit as claimed in claim 9, wherein said third logic means is an AND gate for ANDing the first logic signal and the second logic signal.

13. A circuit as claimed in claim 9, wherein said fourth logic means includes a first D flip-flop having a first D input terminal, a first clock input terminal, a first reset terminal, and a first Q output terminal, the first D flip-flop outputting the third logic signal which is inputted through the first D input terminal as a clock signal is inputted through the first clock input terminal thereof and being reset when the horizontal drive signal is inputted to the first reset terminal; and a second D flip-flop having a second D input terminal, a second clock input terminal, a second reset terminal, and a second Q output terminal, the second D flip-flop outputting a first Q output signal from the first Q output terminal as a clock signal is inputted through the second clock input terminal thereof and being reset when the horizontal drive signal is inputted to the second reset terminal.

14. A circuit as claimed in claim 9, wherein said determination means includes a delay for delaying the second logic signal for a predetermined period in order to synchronize the second logic signal with the voltage-sensed signal;

a first T flip-flop for inverting the delayed signal at the positive-edge of the delayed signal in order to generate a first T-signal, and outputting the first T-signal as a reference signal to an XOR gate;

a second T flip-flop for inverting the voltage-sensed signal at the positive-edge of the voltage-sensed signal in order to generate a second T-signal, and outputting the second T-signal as a comparison signal to the XOR gate; and the XOR gate for XORing the reference signal and the comparison signal in order to generate a determination signal.

15. A circuit for detecting a wrong operation of a flyback transformer having a low voltage coil and a high voltage coil, the circuit comprising:

an oscillator for generating a horizontal frequency signal;

a horizontal drive circuit for developing a horizontal drive signal according to the horizontal frequency signal;

a horizontal output circuit for generating a flyback pulse signal according to the horizontal drive signal;

a voltage sensing coil which is disposed at the flyback transformer in order to generate a sensed voltage corresponding to a high voltage generated by the high voltage coil;

a schmitt trigger for schmitt-triggering the sensed voltage, thereby generating a first logic signal;

an inverter for inverting the flyback pulse signal, thereby generating a second logic signal;

an AND gate for ANDing the first logic signal and the second logic signal;

a first D flip-flop having a first D input terminal, a first clock input terminal, a first reset terminal, and a first Q output terminal, the first D flip-flop outputting the third logic signal which is inputted through the first D input terminal as a clock signal is inputted through the first clock input terminal thereof and being reset when the horizontal drive signal is inputted to the first reset terminal;

a second D flip-flop having a second D input terminal, a second clock input terminal, a second reset terminal, and a second Q output terminal, the second D flip-flop outputting a first Q output signal from the first Q output terminal as a clock signal is inputted through the second clock input terminal thereof and being reset when the horizontal drive signal is inputted to the second reset terminal;

a delay for delaying the second logic signal for a predetermined period in order to synchronize the second logic signal with the voltage-sensed signal;

a first T flip-flop for inverting the delayed signal at the positive-edge of the delayed signal in order to generate a first T-signal, and outputting the first T-signal as a reference signal to a XOR gate;

a second T flip-flop for inverting the voltage-sensed signal at the positive-edge of the voltage-sensed signal in order to generate a second T-signal, and outputting the second T-signal as a comparison signal to the XOR gate;

the XOR gate for XORing the reference signal and the comparison signal in order to generate a determination signal; and a transistor having a collecter terminal which is connected with an output terminal of the horizontal drive circuit, a base to which a determination signal generated by the determination means is inputted, and an emitter terminal which is connected with a ground.

* * * * *